United States Patent [19]
Pungtrakul

[11] Patent Number: 5,959,006
[45] Date of Patent: Sep. 28, 1999

[54] METHOD FOR THE PREVENTION OF BLOCKING IN LINEAR LOW DENSITY POLYETHYLENE FILMS

[75] Inventor: Chaloke Pungtrakul, 281 Sukhumvit 50, Klong Toey Sub-district, Prakanong District, Bangkok, Thailand

[73] Assignee: Chaloke Pungtrakul, Thailand

[21] Appl. No.: 08/907,999

[22] Filed: Aug. 11, 1997

Related U.S. Application Data

[63] Continuation of application No. 08/553,341, filed as application No. PCT/GB94/01159, May 27, 1994, abandoned.

[30] Foreign Application Priority Data

May 28, 1993 [GB] United Kingdom .................... 9311078

[51] Int. Cl.$^6$ ................. C08L 23/16; C08J 5/18
[52] U.S. Cl. ................ 524/1; 524/186; 524/261; 525/240
[58] Field of Search ............... 525/240; 524/1, 524/186, 261

[56] References Cited

U.S. PATENT DOCUMENTS

| | | | |
|---|---|---|---|
| 3,375,303 | 3/1968 | Joyce | 525/240 |
| 4,824,912 | 4/1989 | Su | 525/240 |
| 5,073,437 | 12/1991 | Akao | 428/220 |

FOREIGN PATENT DOCUMENTS

| | | |
|---|---|---|
| 0177046 | 9/1985 | Japan . |
| 3053930 | 3/1991 | Japan . |
| 9217539 | 10/1992 | WIPO . |

*Primary Examiner*—Jeffrey Mullis
*Attorney, Agent, or Firm*—Nixon & Vanderhye

[57] ABSTRACT

A method for the prevention of blocking in Linear Low Density Polyethylene (LLDPE) films is provided, said method comprising the incorporation of at least a preselected High Density Polyethylene (HDPE) resin and a slip additive into the LLDPE film base resin at appropriate let-down ratios. The incorporation of the preselected HDPE resin and the slip additive into the film base resin can be accomplished in several ways. Regardless of the method of incorporation, after the extrusion and as the melt cools the preselected HDPE resin will give rise to the formation of larger crystals. Parts of these larger crystals will protrude from the film surfaces and trap the air, preventing it from being squeezed out from the gap in between two layers of film. Thus an antiblocking effect can be achieved without impairing the clarity, the gloss, the color, and the appearance of the film. In addition, the extrusion will be easier without excessive wears in the screws or the barrels, and certain mechanical strengths of the film may also be improved.

20 Claims, 7 Drawing Sheets

| RESIN | CRYSTAL GROWTH RATE (microns/second) | MAXIMUM CRYSTALLINITY |
|---|---|---|
| HDPE | 33.00 | 0.80 |
| PP | 0.33 | 0.63 |
| POLYESTER | 0.12 | 0.50 |
| PS | 0.0042 | 0.32 |

METHOD FOR THE PREVENTION OF BLOCKING IN LINEAR LOW DENSITY POLYETHYLENE FILMS

This is a rule 62 file wrapper continuation of application Ser. No. 08/553,341, filed Feb. 26, 1996, now abandoned which is a national stage application of RT/6894/01159, filed May 27, 1994.

The present invention is related to the prevention of blocking in plastic films in general, and more particularly, it is related to the prevention of blocking in plastic films produced from semi-crystalline, semi-amorphous Linear Low Density Polyethylene resins.

In the fabrication of films, especially blown films, from semi-crystalline, semi-amorphous resins such as Linear Low Density Polyethylene (LLDPE) which are to be converted into various types of plastic bags such as soft-drink bags, rice bags, sugar bags, produce bags, ice bags, deep-freeze bags, garment bags, merchandise bags, and industrial liners, it is essential for the plastic melt to cool relatively fast after it has been extruded from the die (see FIG. 1) in order to achieve the required bubble stability, high output and good clarity and gloss in the films. Thus, various attempts have been made to increase the cooling rate, including increasing the flow speed and the amount of the cooling air, employing multi-lip and/or multi-layer air-rings, and employing as the cooling medium chilled air, and even chilled water.

However, either insufficient cooling (resulting, for example, from too high output) or an excessively fast cooling rate may exacerbate the blocking problem in the films. In the case of excessively fast cooling, the molecules of the plastic melt will have a relatively short time to rearrange themselves as the bulk of the plastic melt freezes, resulting in smaller crystals (or spherulites). Even though this may enhance the clarity and gloss of the films, the films may block and consequently after conversion into bags, the bags may be difficult to open. The blocking problem in plastic films is also further aggravated by improvements in the mechanical strengths of plastic resins, which enable substantial down-gauging for the corresponding applications.

European specification 0308088-A describes blends of a major proportion of linear low density polyethylene (LLDPE) and minor proportions of each of low molecular weight and high molecule weight high density polyethylenes. These blends are stated to exhibit lower extrusion head pressure and lower extruder torque than LLDPE and to be extrudable into high quality films.

European specification 0330168-A describes a packaging material for photosensitive materials not occuring lump generation trouble, fish eye trouble nor blocking, having a great physical strength and being excellent in bag-making ability and inexpensive, comprising a light-shielding film layer containing in specified amounts a linear very low density polyethylene, a polyethylene having a density of 0.930 to 0.965 g/cm$^3$, carbon black and antioxidant. It is stated that the carbon black imparts light-shielding and antistatic and antistatic property, and improves antiblocking property and physical strength.

In the prior art, the prevention of blocking in plastic films and subsequent difficulty in opening the bags is achieved by adding an antiblock additive and a slip additive. The most common antiblock additives used are siliceous type additives such as Gasil 114 available from Crossfield Chemicals and Ziloblock 47 available from W. R. Grace & Co. These siliceous type additives comprise silica particles with the median size ranging from 3–5 microns, and are normally added to the film resins in ratios of from 0.1–1.0 parts per hundred parts resin depending on the effectiveness of that particular siliceous type additive and the anticipated cooling rate and thicknesses of the film to be produced. After extrusion from the die, and as the plastic melt freezes, parts of this siliceous type additive will protrude from the film surfaces and trap the air, preventing the air from being squeezed out from the gap in between two layers of film. Thus the film will not block.

The most common slip additives used are fatty acid amide type additives such as oleamide and erucamide available from Croda Universal and Unichema. These slip additives are compounds which are not compatible with the plastic, and are normally added to the film resins in ratios of from 0.1–0.2 parts per hundred parts resin. After the extrusion of the films, these slip additives will migrate to the film surfaces and reduce their coefficient of friction. Thus the two layers of the film will part more readily, and the bags will be easier to open.

Even though the siliceous type additives are effective antiblocks for plastic films, they have several drawbacks. First, they have a bulk density of only about 0.15 g/cm$^3$ and can be easily blown away, which complicate their incorporation into the film resins.

Secondly, they are difficult to disperse uniformly throughout the resins, and unhomogeneous mixing may result in gels in the films. Thus special techniques are normally required in incorporating them. For example, a master batch containing a siliceous type additive and a slip additive in ratios of from 5 to 10 parts per hundred parts resin may have to be repared prior to the addition to the film resin.

Thirdly, the siliceous type additive will increase the viscosity of the plastic melt and render the extrusion more difficult generating higher shear stress and wasting more energy in driving the extruder screw. The higher shear stress can also result in degraded melt, thus reducing the mechanical strengths of the film and increasing its yellowness.

Fourthly, since the siliceous type additives have very hard surfaces (hardness values of from 7–7.5 on the Moh scale in which talc has a hardness of 1 Moh and diamond has a hardness value of 10 Moh), the extruder screw and the barrel employed in the extrusion process will wear out very quickly.

Fifthly, since the siliceous type additives may have refractive indices different from that of the plastic, and are usually of irregular shapes with corners and nicks, the clarity and gloss of the film can be impaired.

In view of the above disadvantages of siliceous type additives, various attempts have been made to switch to other types of antiblocks. One type of antiblocks sometime used instead of the siliceous type includes the talc type additives such as Talc No. 10M005 available from Talcs le Luzinac. These talc type additives are typically of larger particle sizes compared to the siliceous type additives, but are somewhat less effective as antiblocks. Thus they must be incorporated into the base resins at higher ratios. Even though these talc type additives have much softer surfaces (a hardness value of 1 Moh), nevertheless due to their larger particle sizes and higher let-down ratios, the problems of increased viscosity of the plastic melt and impaired clarity and gloss of the film tend to be even more pronounced.

There have also been attempts to manufacture resins of abnormally higher densities specifically for water-quenched blown-films. An example of such resins is Nippon Unicar's LLDPE No. 5523. It should be mentioned, however, that such method for the prevention of blocking in LLDPE films will be effective only if the manufactured resins have relatively high densities. Thus the disadvantages with this approach is that the mechanical strengths, clarity and gloss of the film will be greatly impaired.

A Japanese patent, JP 750004034 B, entitled "Block-proof Polyethylene Film Composition" and assigned to Nippon Petrochemical Co., on the other hand, has shown that the addition of a High Density Polyethylene (HDPE), a lubricant and an antioxidant at certain levels can help prevent blocking in Low Density Polyethylene (LDPE) obtained from high pressure processes without necessitating the use of additional silica compound. However, while the claimed composition may be applicable to conventional, high pressure LDPE produced by free radical polymerization, it would be ineffective for LLDPE which is a copolymer of ethylene and a higher alpha-olefin produced by coordination polymerization using, for example, a transition metal/aluminium alkyl (Ziegler type) catalyst. This is due to the fact that LLDPE exhibits a number of properties which make it a very different material from conventional, high pressure LDPE. For example, it has a higher crystalline melting point and displays a higher shear viscosity at increasing shear rates but lower extensional viscosity and relatively little strain hardening. The higher temperatures required during extrusion and its more tacky nature result in LLDPE films that are more prone to adhere together than conventional, high pressure LDPE films. The higher extrusion temperature, higher shear stress and catalyst residue also tend to make LLDPE more susceptible to extrusion damage and long-term degradation.

It is therefore an object of the present invention to provide a method for the prevention of blocking in LLDPE films that will not impair the clarity, the gloss, the color, or the appearance of the film.

It is another object of the present invention to provide a method for the prevention of blocking in LLDPE films that will not render the extrusion more difficult or produce excessive wear in the screws or the barrels of the extruders.

It is also another object of the present invention to provide a method for the prevention of blocking in LLDPE films that will not adversely affect the mechanical strengths of the films or can even enhance certain mechanical strengths of the films.

It is yet another object of the present invention to provide a method for the prevention of blocking in LLDPE films that can enable faster cooling rates.

It is still another object of the present invention to provide a method for the prevention of blocking in LLDPE films that can be easily applied and will reduce costs.

The above-mentioned as well as other objects of the present invention can be achieved by a method for the prevention of blocking in clear LLDPE films in accordance with the present invention which comprises incorporating into the LLDPE film base resin 0.5 to parts by weight per 100 parts of said film base resin of a HDPE resin having a melt index between 0.5 and 2 grams per 10 minutes and a slip additive, preferably in an amount from 0.05 to 0.2 parts by weight per 100 parts of the film base resin.

The HDPE resin contributes antiblocking effect without resulting in a deterioration in the clarity, the gloss, the color, the appearance, or the mechanical strengths of the film. It preferably has a specific gravity greater than about 0.940 and a narrow molecular weight distribution.

The incorporation of the HDPE resin and the slip additive into the film base resin at the appropriate let-down ratios can be accomplished in several ways. For example, the HDPE resin, the slip additive and the film base resin may be dry-blended in a tumbler mixer or other suitable vessels. An antioxidant may also be incorporated in the film base resin at a ratio from 0.03 to 0.2 parts by weight per 100 parts of the film base resin. The relatively well-blended mixture can then be extruded and converted into films or bags. On the other hand, the HDPE resin, the slip additive and the film base-resin may be melted down and mixed together in an intensive mixer, and subsequently pelletized. The pellets can then be extruded and converted into films or bags. Regardless of the method of incorporation, after the extrusion and as the melt cools the HDPE resin will give rise to the formation of larger crystals which will be substantially uniformly distributed throughout the film. Parts of these larger crystals will protrude from the film surfaces and trap the air, preventing it from being squeezed out from the gap in between two layers of film. Thus the film will not block.

Since the HDPE resin may have a refractive index similar to that of the film base resin, may have a nucleating effect, and/or may disturb the normal crystallization of the film base resin, the clarity and the gloss of the film may be improved. In addition, since the HDPE resin may have a melt viscosity lower than that of the film base resin, may have a relatively soft surface, and may melt at about the same time as the film base resin, the extrusion will be easier without excessive wear in the screws or the barrels. Furthermore, the HDPE resin may also have certain mechanical strengths superior to that of the film base resin and/or may be able to improve at least certain mechanical strengths of the film base resin due to certain synergies.

BRIEF DESCRIPTION OF THE DRAWINGS

Even though the novel characteristics of the present invention have been clearly stated in the appended claims, the above-mentioned as well as other features and advantages of the present invention will be more readily understood from the disclosure below when taken in conjunction with the following Figures and Tables in which:

Table 1 shows the extrusion conditions, the antiblocking effectiveness and the clarity, gloss and certain mechanical strengths of the film containing a siliceous type additive as compared to those of the film containing a HDPE resin when dry-blending (FIG. 2) is used.

Table 2 shows the extrusion conditions, the antiblocking effectiveness, and the colarity, gloss and certain mechanical strengths of the film containing the same siliceous type additive as compared to those of the film containing the same HDPE resin when melting, mixing and subsequent pelletization (FIG. 3) are used.

Figure 1:
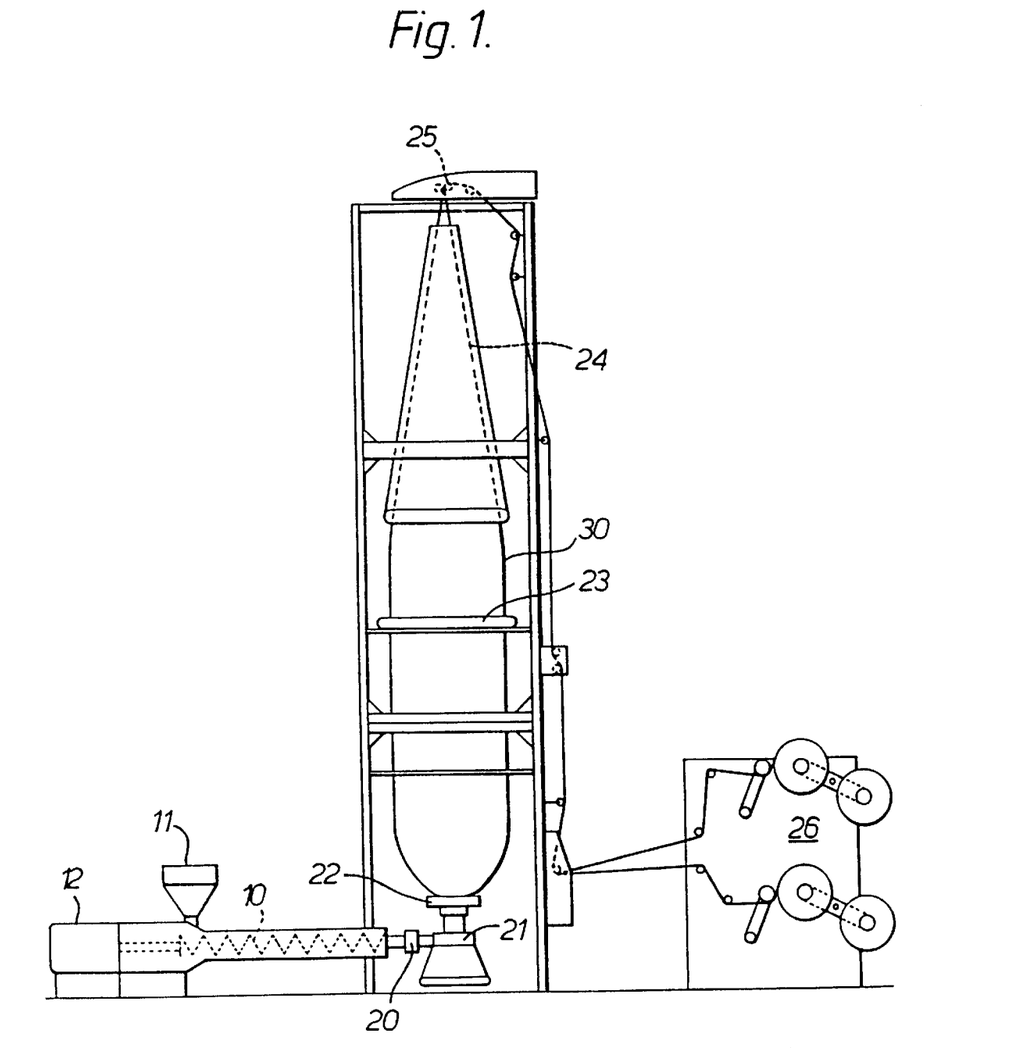
FIG. 1 is a schematic view showing a typical blown film process.

FIG. 1 is a schematic view of the typical blown film formation apparatus which consists of an extruder 10, a coupling 20 which connects the extruder 10 to a die head 21, and air-ring 22, a sizing basket 23, a collapsing frame 24, set of nip rolls 25 and a winder 26. The main components of the extruder 10 comprise a hopper 11, a drive motor 12 and a screw and a barrel (which are not shown). The barrel of the extruder 10 typically has several heater bands. (which are not shown) wrapped around it.

In the blown film forming process, a film resin will be loaded into the hopper 11 and will flow by gravitational force through a hole (which is not shown) in the barrel into the screw channels inside the extruder 10. The drive motor 12 will function to rotate the screw to provide compression and shearing force in the resin. Subjected to the heat from the heater bands around the barrel and the shearing force from the screw, the resin will melt and will be metered through the coupling 20 and the die head 21 which has an annular gap through which the melt can pass. Subjected to the pressure of the air trapped inside, the annular melt thus formed will be inflated into a bubble 30. A high velocity air flow from the air-ring 22 will cool down the bubble causing the plastic melt to freeze. The sizing basket 23 will keep the bubble 30 stable and the collapsing frame 24 will flatten the bubble 30 and fold it into two layers of film in intimate contact with each other. The set of nip rolls 25 and the winder 26 will then haul the two layers of film off onto the winder 26.

Even though in the blown film process exemplified in FIG. 1, only a single air-ring is used for cooling the bubble, the present invention can also be equally applicable in cases with dual air-rings, with internal bubble cooling using chilled air, or even with water-quenching. Increasing the cooling rate will usually increase the propensity of the two layers of film in intimate contact to block, especially when relatively thin film is being converted from Linear Low Density Polyethylene (LLDPE), or when the set of nip rolls 25 or the winder 26 applies too high a tension.

In addition, even though the film conversion technique exemplified in FIG. 1 may be a blown film process, the present invention can also be equally applicable to other film conversion techniques such as a cast film process whereby the plastic melt is extruded through a T-die and is cooled by chilled rolls (In this case, the film may block after its subsequent conversion into bags.).

Figure 2:
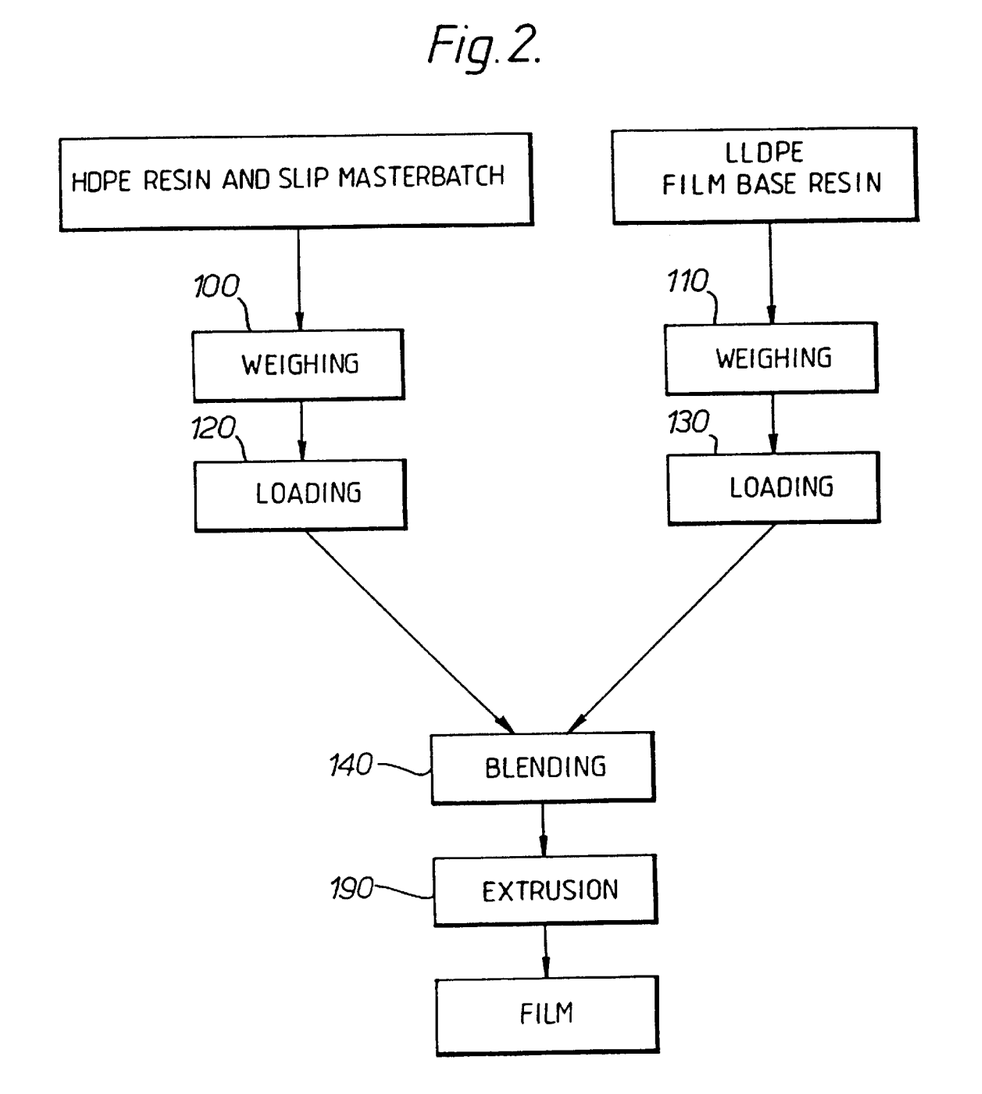
FIG. 2 is a block diagram showing a preferred method that can be used to dry-blend a HDPE resin, a slip additive, and an LLDPE film-grade base resin.

FIG. 2 is a block diagram showing the steps that can be used to dry-blend a High Density Polyethylene (HDPE) resin and an LLDPE film-grade base resin prior to film conversion. As shown in steps 100 and 110 in FIG. 2, a HDPE resin and a film-grade base resin are respectively weighed in accordance with a predetermined ratio. In general, the ratio between the weight of the HDPE resin and the weight of the base resin that is necessary to prevent the blocking in the film should not exceed about 10 parts per hundred parts resin the preferred ratio being from 3 to 5 parts per hundred parts resin. The incorporation of such low levels of the HDPE resin into the base resin will least adversely affect the mechanical strengths of the film. Another advantage of such low levels of the HDPE resin is that, during the extrusion, the HDPE resin will be more easily dispersed. Thus the film will be more homogeneous and free from such defects as flow marks and gels.

In steps 120 and 130, the HDPE resin and also the film base resin, which have been weighed in the previous steps, are loaded into a blender such as a tumbler mixer. In step 140, the HDPE resin and the film base resin are relatively well-blended together to help facilitate the dispersion of the HDPE resin in subsequent extrusion. Then, in step 190, the relatively well-blended mixture may be loaded into the hopper 11 and extruded into film as already explained in connection with FIG. 1.

Even though the weighing, the loading into a blender, the blending, and the loading into the hopper depicted in FIG. 2 have been described in terms of batch-wise operations, in actual practice, certain of these steps may be continuous, combined, or even eliminated. For example, weight belt feeders, volumetric screw feeders or dispensing hoppers may be used for continuously weighing the resins and loading them into a blender. A static mixer may be used to blend the resins together continuously as they flow through by the force of gravity. On the other hand, the mixer may not be used at all and the resins may be continuously weighed and fed to the hopper of the extruder, or even a satellite extruder may be used to directly feed the HDPE resin into the main extruder of the film conversion equipment.

The method of incorporation shown in FIG. 2 is preferably utilized when the LLDPE film base resin already contains certain amounts of antiblock additive and slip additive, but a still greater antiblocking effectiveness is desired. In addition to the HDPE resin, a slip additive may also be weighed and loaded into the blender in steps 100 and 120. In this case, to facilitate the dispersion of the HDPE resin in subsequent extrusion, the slip additive should be in the form of a slip masterbatch (which may contain, for example, 5 parts of slip additive per hundred parts resin).

Figure 3:
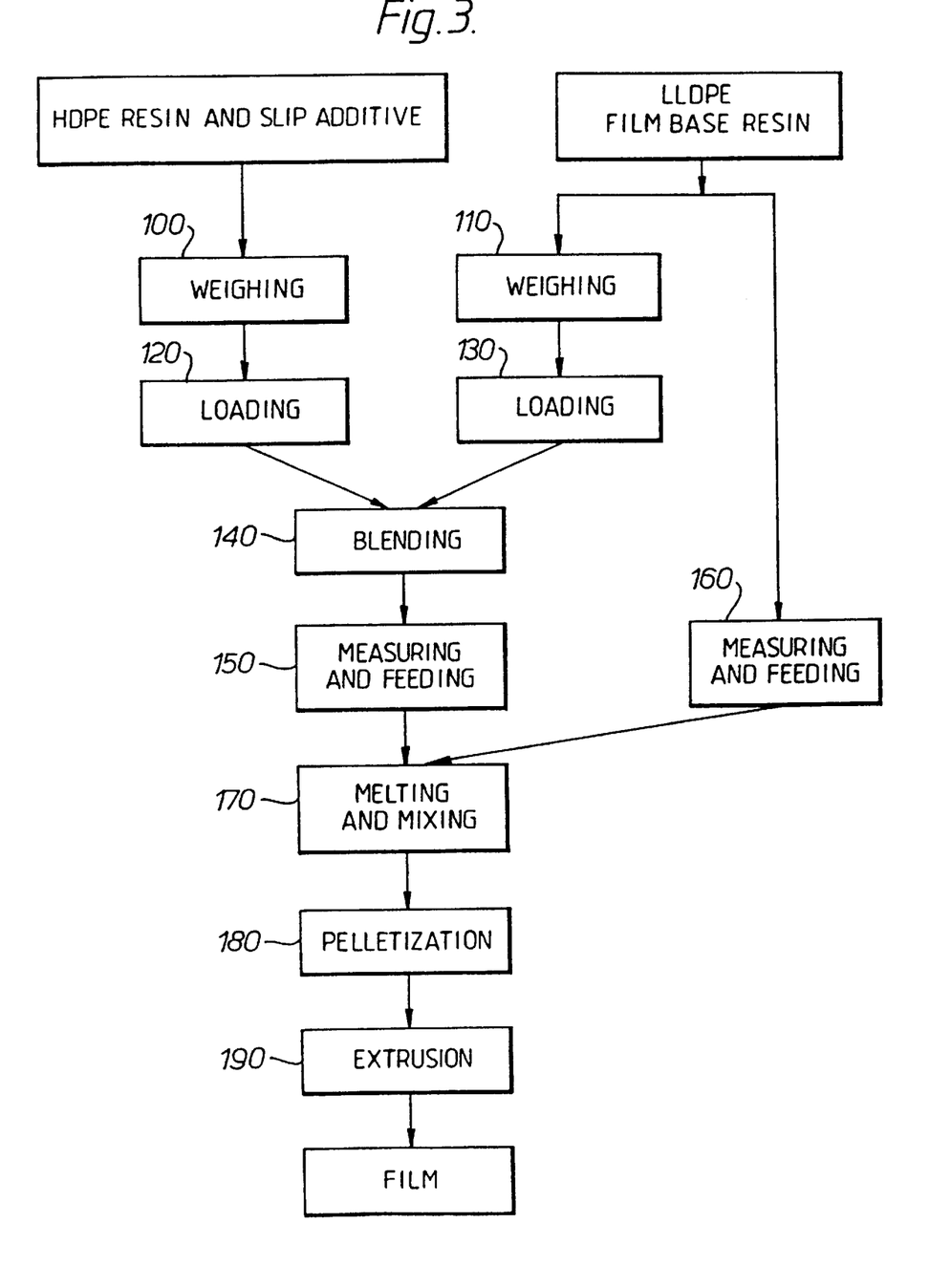
FIG. 3 is a block diagram showing a preferred method that can be used to melt down, mix together, and subsequently pelletize a HDPE resin, a slip additive, and an LLDPE film-grade base resin.

FIG. 3 is a block diagram showing the steps that can be used to melt down, mix together, and subsequently pelletize a HDPE resin, a slip additive, and an LLDPE film-grade base resin prior to the film conversion in accordance with another preferred method of incorporation of the present invention. The steps 100 to 140 shown in FIG. 3 are substantially identical to the steps 100 to 140 shown in FIG. 2. There are only three differences. First, in steps 110, 130 and 140 of FIG. 3, only a portion (for example 2–5%) of the film base resin is weighed, loaded into a blender, and dry-blended with the HDPE resin while the rest (the major part) of the film base resin is diverted to an intensive mixer (in step 160). Secondly, in addition to the HDPE resin, a slip additive is also weighed and loaded into the blender in steps 100 and 120. And thirdly, the blender used in step 140 of FIG. 3 should be a relatively high capacity blender such as a ribbon blender or a Henschel mixer.

In steps 150 and 160 of FIG. 3, the relatively well-blended mixture from step 140 and the rest of the film base resin are respectively weighed and fed to the intensive mixer. These steps may be accomplished by using for example loss-in-weight feeders which can accurately control the measuring and the feeding rates. In general, the steps 100 to 140 can actually be omitted and the HDPE resin, the slip additive and the film base resin separately weighed and fed to the intensive mixer as in the steps 150 and 160. However, since the let-down ratio of the slip additive is usually very small, steps 100 to 140 will render its measuring and feeding more accurate as well as eliminating the need for an additional loss-in-weight feeder.

In step 170, the HDPE resin, the slip additive, and the film base resin are molten and are kneaded together, for example, by using a twin screw extruder. In step 180, the molten and relatively well-kneaded mixture is extruded, for example, by using a single screw extruder, and pelletized for example, by sing an under-water cutter. The advantage of pelletization prior to the film conversion in step 190 is that the film converters in step 190 may have separate entities from the resin producer in steps 100 to 180. In this case, such converters will be able to directly use the "ready-made" pellets without themselves having to effect the step of incorporating the HDPE resin and the slip additive. Thus a much greater convenience is achieved.

Even though the steps that have been described in connection with FIG. 3 are well suited to relatively high capacity productions, certain of these steps may be modified, combined, or even eliminated to simplify operations, especially for smaller scale runs. For example, in step 180, a gear pump may be used instead of a single screw extruder. On the other hand, the twin screw extruder in step 170 may directly deliver the melt to the under-water cutter in step 180, or the single screw extruder in step 180 may also perform the functions of the twin screw extruder in step 170. Alternatively, a Banbury mixer may be used instead of a twin screw extruder in step 170, the steps 140 to 160 may be omitted, and the resins and slip additive may be weighed and loaded batch-wise into the Banbury mixer.

Furthermore, even though FIG. 3 depicts the HDPE resin and the film base resin as coming from different sources, in actual practice, it is also possible to produce these resins in appropriate ratios in a single batch reactor or in two or more continuous reactors connected in series. (In this case, both resins would be channelled through steps 110 and 160 while only the slip additive would be channelled through step 100.) It is also possible for the relatively well-blended mixture from step 140 to be sold off as "ready-made" resin. (In this case, step 150 to 180 would be eliminated.)

Figure 4:
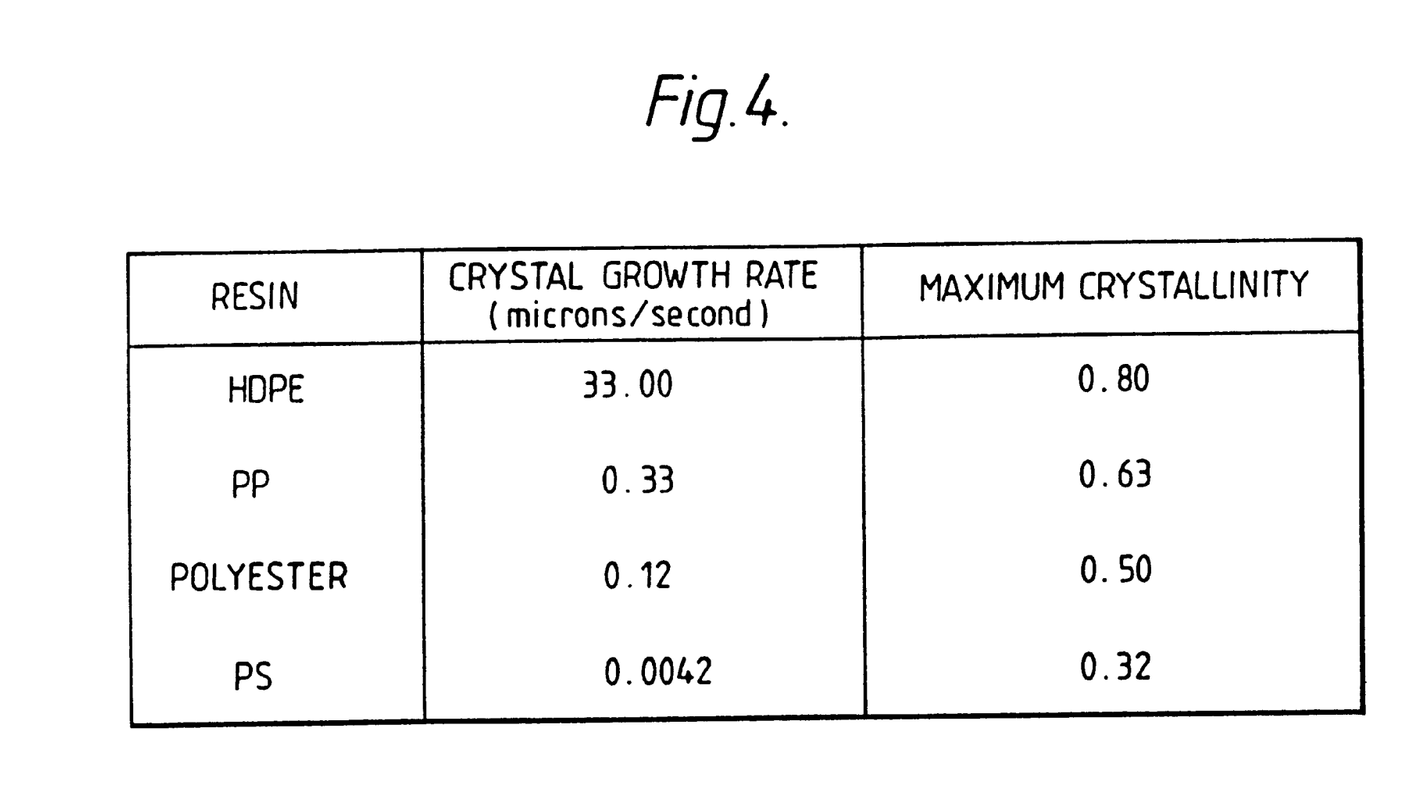
FIG. 4 is a table showing the crystal growth rates and the maximum crystallinities of certain plastic resins.

FIG. 4 is a table listing the crystal growth rates and the maximum crystallinities of certain commodity plastic resins in a descending order. From the list in FIG. 4, it can be seen that the crystal growth rate and the maximum crystallinity of High Density Polyethylene (HDPE) are much higher than those of other resins. Thus the HDPE resin will be able to form much larger crystals during the cooling of the melt.

Figure 5:
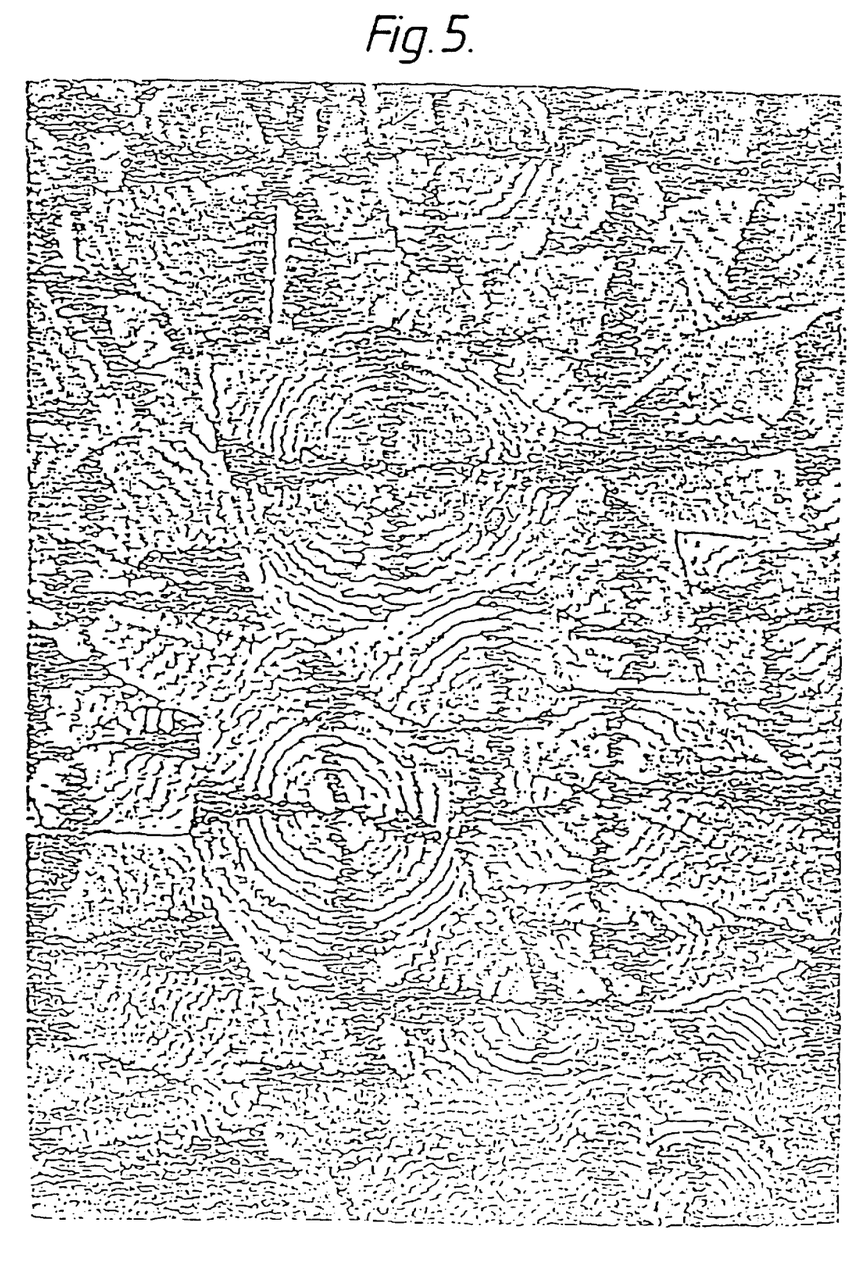
FIG. 5 is a photographic view showing the relatively large crystals of a high density polyethylene resin.

FIG. 5 is a photographic view showing the crystals of an HDPE resin that may be selected to provide the antiblocking effect in accordance with the present invention. More particularly, FIG. 5 shows the crystals of an HDPE resin which appear as Maltese crosses when viewed through a microscope under a polarized light. Due to its fast crystal growth rate (33 microns per second from FIG. 4), the resin is able to form relatively large crystals with the median diameter of about 3–5 microns. These large crystals are ideally suited to provide the antiblocking effect in accordance with the present invention. At this point, it should also be mentioned that increasing the density of LLDPE resin can increase its crystal growth rate and hence its antiblocking property. But since the crystal growth rate of LLDPE is much lower than that of HDPE, its density must be raised much higher than normal to achieve any significant antiblocking effect. Thus, the mechanical strengths, clarity and gloss of the film will be greatly impaired.

Figure 6:
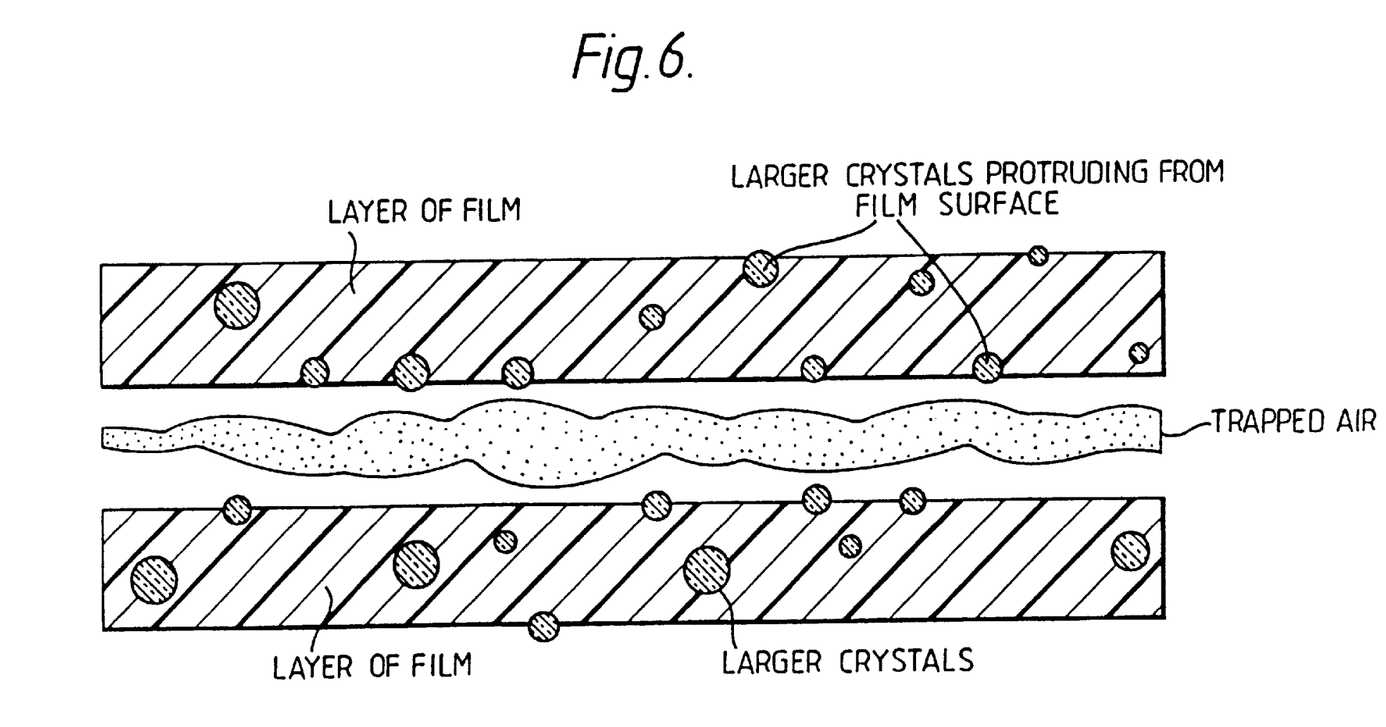
FIG. 6 is a schematic view showing how the larger crystals function to provide antiblocking effect.

FIG. 6 is an enlarged view showing the cross section of two layers of film in intimate contact with each other. From FIG. 6, it can be clearly seen how the larger crystals from the HDPE resin function to provide an antiblocking effect. After the incorporation of the HDPE resin and a slip additive into an LLDPE film base resin and after extrusion, as the film cools, the HDPE resin will form larger crystals which will be uniformly distributed throughout the film (the black dots in FIG. 6). Parts of these larger crystals will protrude from the surface of the film and trap the air, preventing it from being squeezed out from the gap in between the two layers of the film. This trapped air (the shaded area between the two layers of film in FIG. 6) will prevent blocking of the film. These larger crystals are shown as spherical, merely in order to simplify the drawing, but are in practice multi-faceted.

Figure 7:
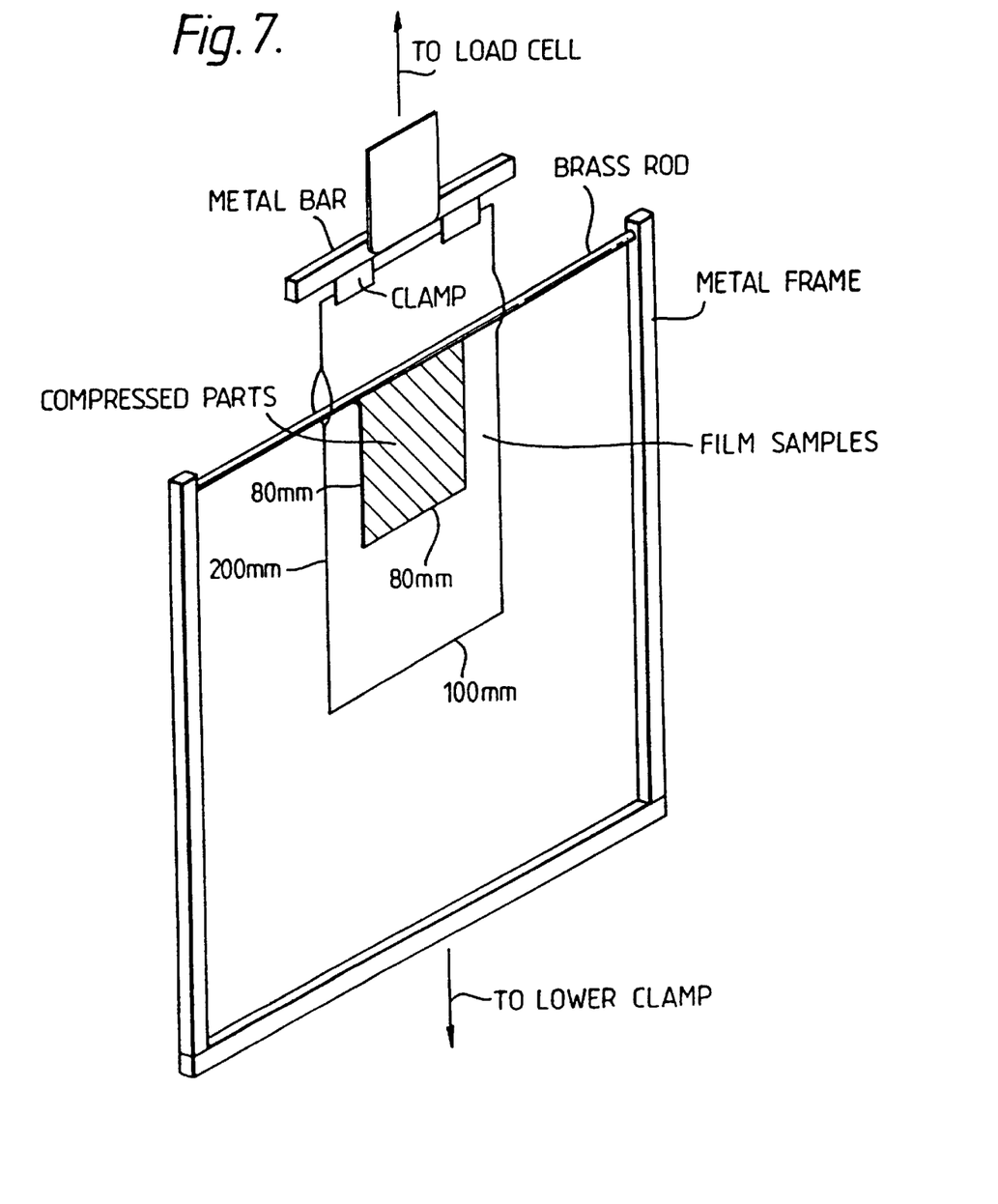
FIG. 7 is a schematic view showing the method used to test blocking forces of the films.

FIG. 7 is a schematic view showing the method used to test the force necessary to separate two layers of film, i.e. the blocking force of the film. This test can provide a measure of the propensity of the film to block in the actual use conditions. In this test, two sample pieces of 100 mm×200 mm film are placed in intimate contact with their inside surfaces touching each other and are then compressed into contact by an 80 mm×80 mm area 1kg load at 60° C. for 72 hours. Thereafter, one of their ends is clamped to the upper load cell of an Instron tensometer (not shown) with a Teflon (PTFE)-coated brass rod inserted between the uncompressed parts of the film samples as shown in FIG. 7. The brass rod itself is connected to a metal frame attached to the lower clamp of the Instron tensometer. As the lower clamp of the Instron tensometer descends, the brass rod will separate the 80 mm×80 mm compressed parts in the middle of the film samples from each other. The average force used to pull down the brass rod will be the force required to separate the two layers of the film or the blocking force of the film. A film which requires a separation force less than about 0.5 Newton will not block in the actual use conditions.

Table 1 compares the effects of a siliceous type additive to the effects of a preferred method of the present invention. The data presented in the table include the extrusion conditions, the blocking forces, and the clarity (or haze), gloss and certain mechanical strengths of the film, when (a) no antiblock or slip additive is used (Sample 1), (b) a siliceous type additive and a slip additive are used (Sample 2) and (c) an HDPE resin, a slip masterbatch and an LLDPE film base resin are dry-blended prior to film conversion (Sample 3). The HDPE resin used in the preparation of Sample 3 is an HDPE resin wit h a density of 0.954 g/cm$^3$, a melt index (MI) of 0.8 g/10 minutes, and a narrow molecular weight distribution (MWD), and the film base resin is an LLDPE resin with a density of 0.918 g/cm$^3$ and an MI of 1.0 g/10 minutes. Since the HDPE resin has be en selected to have an MI similar to that of the film base resin, their melt viscosities are also relatively similar which facilitates the dispersion of the former. And since the HDPE resin has been selected to have a narrow MWD, the clarity of the film would not be impaired.

From row s 5–7 in Table 1 it can b e seen that, during the extrusion, the melt pressure, the torque and the power required to drive the screw become higher when the siliceous type additive is used, but they are reduced when the HDPE resin is used. From row 8 in the table, it can be seen that the siliceous type additive and th e resin with the faster crystal growth rate are both effective antib locks. The blocking forces of Sample 2 and Sample 3 are both close to 0.5 Newton. From rows 9 and 10, it can be seen that the haze of t he film increases when the siliceous type additive is used, but decreases when the HDPE resin is used; the gloss of the film decreases when the siliceous type additive is used, but increases when the HDPE resin is used. From rows 11 to 14, it can be seen that the tensile strength at yield, the tensile strength at break, the elongation at break, and the Elmendorf tear resistance of the film are all improved when the HDPE resin is used instead of the siliceous type additive.

Table 2 is a table similar to Table 1, however, in this table, the effects of siliceous type additive are compared to the effects of another preferred method of the present invention. More particularly the HDPE resin and the LLDPE film base resin used in the preparation of Sample 3 in Table 2 are the same resins as those used in the preparation of Sample 3 in Table 1, but these resins and a slip additive are melted, mixed together and subsequently pelletized rather than dry-blended prior to film conversion. From Table 2, it can be seen that the HDPE resin produces similar extrusion, antiblocking, aesthetic, and mechanical advantages as those described in connection with Table 1 even when incorporated into the film base resin in this way. It should also be mentioned that the improved aesthetic and mechanical properties of the film containing low levels of the HDPE resin in both Figures may also be due to a nucleating effect or certain synergism.

From the above description, it can be seen that the method in accordance with the present invention for the prevention of blocking in LLDPE films can provide an antiblocking effect without impairing the clarity and the gloss of the films. In addition, the extrusion will be easier and at least certain mechanical strengths of the films may also be improved.

Even though the present invention has been described with reference to certain preferred embodiments thereof, it should be apparent to those skilled in the art that the above-mentioned as well as many other modifications may be made without departing from the spirit and the scope of the present invention as specified by the claims.

TABLE 1

|  | Test Method | Sample 1 | Sample 2 | Sample 3 |
|---|---|---|---|---|
| Main Components |  |  |  |  |
| LLDPE (%) |  | 100.00 | 99.70 | 94.00 |
| Siliceous Type Additive (%) |  | — | 0.15 | — |
| HPDE (%) |  | — | — | 5.00 |
| Slip Additive (%) |  | — | 0.15 | 1.00[1] |
| Extrusion Conditions |  |  |  |  |
| Melt Pressure (kg/cm$^2$) |  | 158 | 173 | 154 |
| Torque (kg-cm) |  | 1,150 | 1,180 | 1,100 |
| Power Requirement (amp/kg/hr) |  | 1.65 | 1.79 | 1.56 |
| Blocking Force (Newton)[2] |  | 1.01 | 0.52 | 0.43 |
| Aesthetic Properties[2] |  |  |  |  |
| Haze (%) | ASTM D1003 | 8.8 | 10.3 | 7.8 |
| Gloss | ASTM D2457 | 103 | 79 | 110 |
| Mechanical Properties[2] |  |  |  |  |
| Tensile at Yield (kg/cm$^2$) | ASTM D638 | 89 | 87 | 94 |
| Tensile at Break (kg/cm$^2$) | ASTM D638 | 361 | 305 | 315 |
| Elongation at Break (%) | ASTM D638 |  |  |  |
| Elmendorf Tear (g) | ASTM D1922 | 214 | 226 | 241 |

Notes
[1]Slip masterbatch with 7.5% slip additive.
[2]For 30 micron film.

TABLE 2

|  | Test Method | Sample 1 | Sample 2 | Sample 3 |
|---|---|---|---|---|
| Main Components |  |  |  |  |
| LLDPE (%) |  | 100.00 | 99.70 | 94.00 |
| Siliceous Type Additive (%) |  | — | 0.15 | — |
| HPDE (%) |  | — | — | 3.00 |
| Slip Additive (%) |  | — | 0.15 | 0.15 |
| Extrusion Conditions |  |  |  |  |
| Melt Pressure (kg/cm$^2$) |  | 168 | 172 | 164 |
| Torque (kg-cm) |  | 1,140 | 1,180 | 1,120 |
| Power Requirement (amp/kg/hr) |  | 2.11 | 2.12 | 2.08 |
| Blocking Force (Newton)[1] |  | 1.01 | 0.52 | 0.45 |
| Aesthetic Properties[1] |  |  |  |  |
| Haze (%) | ASTM D1003 | — | 13.3 | 11.1 |
| Gloss | ASTM D2457 | 89 | 84 | 104 |
| Mechanical Properties[1] |  |  |  |  |
| Tensile at Yield (kg/cm$^2$) | ASTM D638 | 113 | 103 | 115 |
| Tensile at Break (kg/cm$^2$) | ASTM D638 | 316 | 279 | 345 |
| Elongation at Break (%) | ASTM D638 | 741 | 731 | 828 |
| Elmendorf Tear (g) | ASTM D1922 | 106 | 107 | 113 |

Notes
[1]For 30 micron film.

I claim:

1. A method for the prevention of blocking in clear linear Low Density Polyethylene (LLDPE) films formed by extrusion of LLDPE resin, which method consists of
    (1) incorporating into a LLDPE film base resin 0.5 to 5 parts by weight per 100 parts of said film base resin of a High Density Polyethylene resin (HDPE) consisting of HDPE having a narrow molecular weight distribution and a melt index between 0.5 and 2 grams per 10 minutes, and, optionally, a slip additive and thereafter
    (2) extruding the resin composition of step (1).

2. A method in accordance with claim 1, wherein the HDPE resin and the slip additive are incorporated into the film base resin by dry-blending said HDPE resin, said slip additive and said film base resin in a blender or other suitable vessel.

3. A method in accordance with claim 1, wherein the HDPE resin and the slip additive are incorporated into the film base resin by continuously metering and feeding said HDPE resin, said slip additive and said film base resin.

4. A method in accordance with claim 2 or 3, wherein the LLDPE film base resin already contains a slip additive.

5. A method in accordance with claim 2, wherein the slip additive is incorporated as a slip masterbatch based upon LLDPE resin.

6. A method in accordance with claim 1, wherein the HDPE resin and the slip additive are incorporated into the film base resin by melting down, mixing together, and subsequently pelletizing the HDPE resin, slip additive and film base resin.

7. A method in accordance with claim 1, wherein the HDPE resin has a specific gravity greater than about 0.940.

8. A method in accordance with claim 1, wherein the antiblocking effect contributed by the HDPE resin is the major part of the total antiblocking effect.

9. A method in accordance with claim 1, wherein the slip additive is incorporated in an amount from 0.05 to 0.2 parts by weight per 100 parts of the film base resin.

10. A method in accordance with claim 1, wherein the method also includes incorporating an antioxidant(s) into the film base resin at a ratio from 0.03 to 0.2 parts by weight per 100 parts of the film base resin.

11. A non-blocking, clear plastic-film forming composition which when extruded forms a non-blocking clear Linear Low Density Polyethylene (LLDPE) film, said composition consisting of LLDPE film base resin, 0.5 to 5 parts by weight per 100 parts of said film base resin of a High Density Polyethylene (HDPE) resin consisting of HDPE having a narrow molecular weight distribution and having a melt index between 0.5 and 2 grams per 10 minutes and a slip additive.

12. A non-blocking, clear plastic-film forming composition in accordance with claim 11 comprising a dry-blended mixture of said HDPE resin, said slip additive and said LLDPE film base resin, said slip additive being contained either within said LLDPE film base resin and/or within a slip masterbatch based upon LLDPE resin.

13. A non-blocking, clear plastic-film forming composition in accordance with claim 11 wherein said composition comprises pellets having said HDPE resin and said slip additive well-dispersed in said LLDPE film base resin.

14. A non-blocking, clear plastic-film forming composition in accordance with claim 11, wherein said HDPE resin has a specific gravity greater than about 0.940.

15. A non-blocking, clear plastic-film forming composition in accordance with claim 11, which also contains at least one other antiblock additive contributing a minor part of the antiblocking effect.

16. A non-blocking, clear plastic-film forming composition in accordance with claim 11, wherein the said slip additive is incorporated in an amount from 0.05 to 0.2 parts by weight per 100 parts of said film base resin.

17. A non-blocking, clear plastic-film forming composition in accordance with claim 11, which also contains an antioxidant(s) in an amount from 0.03 to 0.2 parts by weight per 100 parts of said film base resin.

18. A non-blocking, clear plastic film consisting of 0.5 to 10 parts by weight per 100 parts of a linear low density polyethylene (LLDPE) film base resin of a High Density Polyethylene (HDPE) resin consisting of HDPE having a narrow molecular weight distribution and having a melt index between 0.5 and 2 grams per 10 minutes and from 0.05 to 0.2 parts by weight per 100 parts of film base resin of a slip additive, well dispersed in a Linear Low Density Polyethylene (LLDPE) film base resin.

19. A non-blocking, clear plastic film in accordance with claim 18 wherein the said HDPE resin has a specific gravity greater than about 0.940.

20. A non-blocking, clear plastic film in accordance with claim 18 wherein said plastic film also contains at least one other antiblock additive or antioxidant contributing a minor part of the antiblocking effect.

* * * * *